(No Model.)
H. W. McNEAL.
HAND WEEDER.
No. 369,119. Patented Aug. 30, 1887.
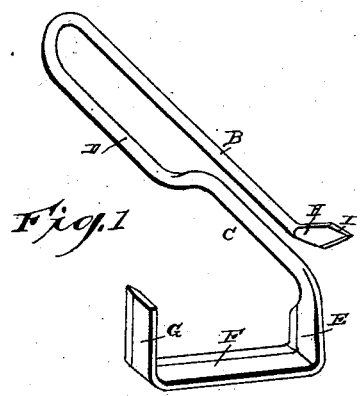
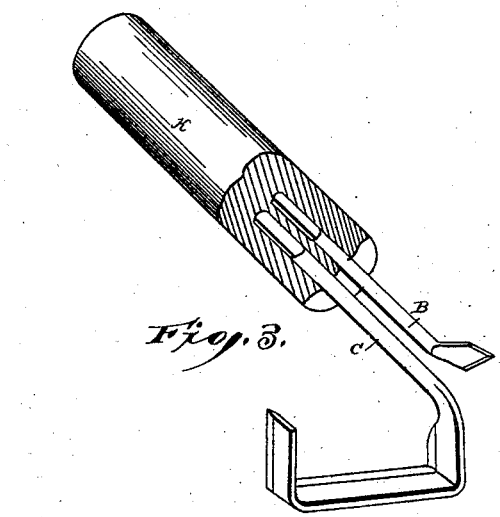
Witnesses
Henry G. Dieterich
John H. Siggers
Inventor
Herbert W. McNeal
By his Attorneys
C. A. Snow & Co.
N. PETERS, Photo-Lithographer, Washington, D. C.

UNITED STATES PATENT OFFICE.

HERBERT WILLARD McNEAL, OF FERNDALE, CALIFORNIA.

HAND-WEEDER.

SPECIFICATION forming part of Letters Patent No. 369,119, dated August 30, 1887.

Application filed June 17, 1887. Serial No. 241,655. (No model.)

*To all whom it may concern:*

Be it known that I, HERBERT WILLARD McNEAL, a citizen of the United States, residing at Ferndale, in the county of Humboldt and State of California, have invented a new and useful Improvement in Hand-Weeders, of which the following is a specification.

My invention relates to an improvement in hand weeding implements; and it consists in the peculiar construction and combination of devices, that will be more fully set forth hereinafter, and particularly pointed out in the claims.

In the drawings, Figure 1 is a perspective view of a weeding implement embodying my improvements. Fig. 2 is a front elevation of the same. Fig. 3 is a perspective view, partly in section, of a modified form of my invention.

My weeding implement is preferably formed of a single bar of steel or other suitable metal, which is first bent at the center to form a pair of parallel arms, B C, the latter of which is arranged directly below the former. At one end of the arm C is a curved offset portion, D, which forms a handle whereby the implement may be readily grasped. The outer ends of the said arm are bent downward nearly at right angles, as at E, and are then bent upwardly at right angles to the axis of the arm to form a horizontal portion, F, the outer end of which is bent upward at right angles to form a vertical portion, G. The vertical portions E and G and the horizontal portion F are broadened and flattened, as shown, and have their inner edges beveled to form a cutting-edge. The horizontal portion F forms a cutting-blade, and the vertical portions E and G form guard-arms arranged at the ends of the said blade.

The outer end of the arm B is bent upward nearly at right angles to form a blade or tooth, H, which is flattened, and has its upper end diamond-shaped and beveled on opposite edges, as at I.

The operation of my invention is as follows: The horizontal blade F is used to stir the ground and kill the weeds between the rows of plants. In order to do this the operator grasps the handle and draws the blade toward him, and presses down upon the handle with sufficient force to cause the blade to work under the ground and thereby sever the stalks and roots of the weeds and effectually kill the same. The tooth or blade H is employed to kill the weeds and work the earth between the plants in the rows.

In Fig. 3 I illustrate a modified form of my invention, in which the arms B and C are formed of separate bars of metal and are socketed in a handle, K, which is made of wood.

A hand weeding implement constructed as hereinbefore described is extremely cheap and simple, is light, is easily manipulated, and will be found of great utility to farmers and truck-gardeners.

Having thus described my invention, I claim—

1. A hand weeding implement having the arms B and C, one of which is arranged above the other, the outer ends of the said arms being bent in opposite directions, the outer end of the arm B being fashioned into the blade or tooth H, and the outer end of the arm C being fashioned into the laterally-extending horizontal blade F, having the vertical guard-arms E and G at its ends, substantially as described.

2. A hand weeding implement made of a single bar of metal bent to form parallel arms B C, the former having its outer end upturned to form the blade H, and the latter having its outer end bent to form the horizontal laterally-extending cutting-blade F, having the vertical arms at its ends, substantially as described.

3. A hand weeding implement having the parallel arms B C, the former having its outer end turned upward to provide the blade H, and the latter having its outer end bent to form the horizontal laterally-extending cutting-blade F, substantially U-shaped in form, forming the guard-arms E G at the ends of the blade, as set forth.

In testimony that I claim the foregoing as my own I have hereto affixed my signature in presence of two witnesses.

HERBERT WILLARD McNEAL.

Witnesses:
E. C. CUMMINGS,
D. M. BRYANT.